United States Patent [19]

Marks et al.

[11] Patent Number: 5,085,896
[45] Date of Patent: Feb. 4, 1992

[54] LATEX-MODIFIED ASPHALT EMULSION TIECOAT MASTIC COATING SYSTEM

[75] Inventors: Allen P. Marks, Richboro, Pa.; Ronald L. Frantz, Riverton, N.J.

[73] Assignee: Rohm and Haas Company, Philadelphia, Pa.

[21] Appl. No.: 545,433

[22] Filed: Jun. 28, 1990

[51] Int. Cl.$^5$ .......................... B05D 3/02; C08L 95/00
[52] U.S. Cl. ................. 427/412.1; 427/393.6; 427/407.1; 106/273.1; 106/271
[58] Field of Search ............................ 106/273.1, 271; 427/393.6, 407.1, 412.1

[56] References Cited

U.S. PATENT DOCUMENTS

| | | | |
|---|---|---|---|
| 3,266,925 | 8/1966 | Lowness | 117/27 |
| 3,620,810 | 11/1971 | Carter | 428/489 |
| 4,291,086 | 9/1981 | Auten | 428/242 |
| 4,654,385 | 3/1987 | Roberts et al. | 524/69 |
| 4,738,723 | 4/1988 | Frizzell et al. | 106/281.1 |
| 4,983,426 | 1/1991 | Jordan, Jr. | 427/407.1 |

FOREIGN PATENT DOCUMENTS

| | | |
|---|---|---|
| 3710405 | 10/1987 | Fed. Rep. of Germany . |
| 7298 | 4/1979 | Japan . |
| 28156 | 2/1982 | Japan . |
| 145164 | 9/1982 | Japan . |
| 145165 | 9/1982 | Japan . |
| 19591 | 5/1987 | Japan . |
| 2918 | 1/1988 | Japan . |

*Primary Examiner*—Theodore Morris
*Assistant Examiner*—Mary C. DiNunzio

[57] ABSTRACT

A method for improving the quality of mastic coating system by using a tiecoat which is composed of an aqueous latex-modified asphalt emulsion. The tiecoat is applied to a substrate and then at least one subsequent coating is applied to the tiecoat to yield a mastic coating system having superior resistance to lack and bleed-through discoloration.

5 Claims, No Drawings

LATEX-MODIFIED ASPHALT EMULSION TIECOAT MASTIC COATING SYSTEM

FIELD OF THE INVENTION

This invention relates to a method for improving the quality of a mastic coating system by using a tiecoat, disposed between a substrate and at least one subsequent coating. More particularly, this invention is directed to a tiecoat composed of an aqueous latex-modified asphalt emulsion which provides improved properties to a mastic coating system when the tiecoat is disposed between the substrate and the mastic topcoat.

BACKGROUND OF THE INVENTION

A large percentage of the roofing market utilizes asphalt-based products, as for example, modified bituminous rolls, as base substrates which are then topcoated with conventional roof mastics to: improve durability (asphalt degradation); provide energy savings (white coating vs. black asphalt); reduce the fire rating, and improve aesthetics. Such coatings are frequently referred to as "roof mastics" although "mastic topcoat" as used herein include any such thick coatings applied to a substantially horizontal surface, such as for example a roof deck, to a substantially vertical surface such as for example a wall, or to other substrate surfaces. Unfortunately, these mastic topcoats have deficiencies. A roof deck, or other surfaces, by design or because of imperfections, may retain water. This ponded water results in blistering and loss of adhesion leading to failure of the mastic topcoat. An asphalt emulsion tiecoat may be employed to improve the resistance to blistering and loss of adhesion of the mastic coating system. However, the asphalt emulsion tiecoat has a deleterious effect on the resistance to bleed-through discoloration of the mastic coating system. In some cases, highly colored bodies in or on the substrate or, more particularly, in the newly applied tiecoat may migrate into and discolor the mastic topcoat. The aqueous tiecoat of this invention which is composed of a latex-modified asphalt emulsion disposed between a substrate and a mastic topcoat gives the mastic coating system improved resistance to tack and bleed-through discoloration without unduly complicating or hindering the application of the mastic coating system.

DESCRIPTION OF THE PRIOR ART

U.S. Pat. No. 3,266,925 discloses an oil-stain-resistant roofing and siding sheet configuration in which lightweight oil fractions migrating from asphalt and bituminous substrates are prevented from staining decorative colored embedded granules by coating the granules with an anionic oleophobic fluorocarbon sizing agent. The incorporation of a cationic polyamine salt into the substrate layer adapted to react with the anionic fluorocarbon coating improves the adhesion between the fluorocarbon coated granules and the substrate layer.

U.S. Pat. No. 3,620,810 discloses a three layer waterproof roof coating with a first layer comprising gypsum, perlite, clay, and other inorganic components, a second layer comprising a waterproof coating containing the components of the first layer with emulsified asphalt added thereto, and a top coating consisting of a polyvinylacetate emulsion and titanium dioxide.

U.S. Pat. No. 4,291,086 discloses a coating of high tensile strength and resilience for roofs and swimming pools comprising an asphalt underlayer, an intermediate layer of woven glass fabric, a first overlayer of acrylic emulsion bonded to the underlayer and intermediate layer and a second overlayer of acrylic resin emulsion bonded to the first overlayer. The coating is disclosed to minimize splitting, localized cracking, wrinkling and blistering and may provide stable cover of existing cracks and wrinkles, for example, on old roofs.

U.S. Pat. No. 4,654,385 discloses an aqueous coating composition in the form of an emulsion of chemically-modified asphalt and a normal, non-modified asphalt in an aqueous emulsification medium. The process of making the aqueous coating composition is also disclosed. The composition is particularly adapted for use as a primer for adhering an asphalt-based membrane to an asphalt and as a damp-proofing coating for basement walls and the like.

German Unexamined Patent Application DE 37 10 405 A1 discloses a composition which comprises a mixture of bitumen and elastomer for use as a seamless, monolithically-applied roofing and sealing layer.

Japanese Kokai Patent SHO 54-7298 discloses an undercoating composition for wall construction which comprises (1) asphalt emulsion, (2) 50–400 weight % inorganic grains, based on weight % solids of the asphalt emulsion, and (3) 1–150 weight % acrylic synthetic resin emulsion, based on weight % solids of the asphalt emulsion. This undercoating composition simplifies the finishing work on wall surfaces and provides waterproofing without forming cracks or separating finished upper layer.

Japanese Kokai Patent SHO 57-145164 discloses an undercoat composition for wall construction which comprises (1) asphalt emulsion, (2) synthetic resin emulsion, and (3) alkali-resistant glass fibers. This undercoating composition simplifies the finishing work on wall surfaces and provides waterproofing without forming cracks or separating finished upper layer.

Japanese Kokai Patent SHO 57-145165 discloses a preparation of an undercoating which involves adjusting the pH of (a) synthetic resin emulsion with (b) a volatile alkaline compound and then mixing the emulsion with (c) asphalt emulsion.

Japanese Kokai Patent SHO 57-28156 discloses a method for improving the corrosion, water and heat resistance and bonding force of emulsion-type lining materials by blending a filler, such as crystalline water glass powder into an emulsion, such as urethane, epoxyl, latex, bitumen-latex, polyvinyl acetate, acrylic resin and the like.

Japanese Patent JP 84-019591-B discloses a mortar finish method which is characterized by applying to plywood, an adhesive composition composed of, per 100 parts by weight of a cationic rubber-asphalt emulsion, 20 to 300 parts by weight of a cationic thermoplastic resin emulsion, and then, after this has dried, applying a coating of mortar to form a mortar coating.

Japanese Patent JP 88-2918 discloses a method for preventing corrosion of concrete caused by water penetration and acid and salt deterioration by applying a two-layer, waterproof, compatible laminate to concrete comprising a primer based on an elastic rubber or a rubber-asphalt emulsion which is covered by an unsaturated polyester resin or epoxy resin containing flake-shaped filler.

None of these references, however, teach the use of a tiecoat, composed of a latex admixed with an asphalt emulsion, disposed between a substrate and a mastic topcoat which solves the problems associated with achieving an effective mastic coating system.

It is therefore an object of this invention to provide an aqueous tiecoat composed of a latex admixed with an asphalt emulsion disposed between a substrate and a topcoat to provide an improved mastic coating system.

It is also an object of this invention to provide an aqueous tiecoat composed of a latex-modified asphalt emulsion disposed between a substrate and a mastic topcoat to give the mastic coating system improved resistance to tack and bleed-through discoloration without unduly complicating or hindering the application of the mastic coating system.

SUMMARY OF THE INVENTION

This invention discloses a method for improving the quality of a mastic coating system which involves:

(a) forming an aqueous tiecoat composition incorporating an asphalt emulsion containing admixed therein at least one latex polymer having a glass transition temperature of less than about 10° C., where said composition contains from about 5% latex solids and 95% asphalt emulsion solids to about 85% latex solids and 15% asphalt emulsion solids, based on the % total solids in the admixture, (b) applying the tiecoat composition to a substrate surface; and (c) applying a mastic topcoat onto the tiecoat composition.

DETAILED DESCRIPTION OF THE INVENTION

This invention is directed to a method for improving the quality of a mastic coating system by using a tiecoat composition disposed between a substrate and mastic topcoat, which results in a mastic coating system having improved resistance to tack and bleed-through discoloration.

A "mastic topcoat" is a relatively thick coating system, conventionally of a dried thickness of about 20 to about 40 mils (0.05 to 0.10 cm), applied to interior or exterior substrates, such as for example, concrete block walls or built-up roofing formed from roofing felts and asphalt or tar.

A "substrate" as used herein may be newly formed or aged surface, such as for example concrete, or it may comprise a first substrate surface freshly or previously treated or coated with at least one coating, such as for example a retarred flat roof.

"Latex" as used herein refers to a water-insoluble polymer which may be prepared by conventional polymerization techniques, such as for example by emulsion polymerization. "Glass transition temperature," or "$T_g$," as used herein means the glass transition temperature of a polymer as calculated by the Fox equation:

$$1/T_{g(A-B\,copolymer)} = \text{weight } \% \ A/T_{g(A)} + \text{weight } \% \ B/T_{g(B)}$$

where $T_{g\,(A-B\,copolymer)}$ is the glass transition temperature of the copolymer containing monomers A and B and $T_{g(A)}$ and $T_{g(B)}$ are the glass transition temperatures of homopolymers containing monomers A and B, respectively. Weight % A and Weight % B are the amount of monomers A and B in the final copolymer. Note: The A—B copolymer may also represent a homopolymer. All temperatures are on the Kelvin scale.

An aqueous tiecoat is applied to the substrate prior to the application of at least one mastic topcoat. The aqueous tiecoat used in the present invention comprises at least one latex admixed with an asphalt emulsion.

The asphalt emulsions useful as components in the tiecoat of this invention are dispersions of asphalt in water. These asphalt emulsions may also contain emulsifiers and stabilizers, such as for example soap or surfactant, which are anionic, cationic or nonionic. A useful asphalt emulsion, for example, is SS-1 h grade asphalt, an anionically-stabilized asphalt emulsion. The asphalt emulsions contain from about 35% solids to about 75% solids, more preferably from about 55% solids to about 65% solids and most preferably about 60% solids. Asphalt emulsions with less than about 35% solids have been found to be detrimental to tack, lower the viscosity below a usable level and unduly prolong the application of the tiecoat. Asphalt emulsions with greater that about 75% solids have been found to be detrimental to stability and increase the viscosity above a usable level. The asphalt emulsions have hardness from about 20 pen hardness to about 100 pen hardness and more preferably from about 20 pen hardness to about 40 pen hardness. Pen hardness values greater than about 100 are too soft for man roofing applications and contribute significantly to surface tack.

The latices used in the tiecoat of this invention may be formed from any monomer or mixture of monomers which yields a water-insoluble latex polymer with a glass transition temperature of less than about 10° C. in the dried state. For example, acrylic ester monomers, including methyl acrylate, ethyl acrylate, butyl acrylate, 2-ethylhexyl acrylate, decyl acrylate, methyl methacrylate, ethyl methacrylate, isodecyl methacrylate, butyl methacrylate; acrylic acid, methacrylic acid, itaconic acid, maleic acid, fumaric acid, styrene, substituted styrenes, butadiene, acrylonitrile, ethylene, vinyl acetate, and the like may be used. It is required that the glass transition temperature of resultant latex be less than about 10° C. so that the tiecoat composition, formed by admixture with the asphalt emulsion, is flexible enough to withstand the requirements of the mastic coating system which may experience exterior temperature extremes and concomitant substrate expansion and contraction. Some of the monomers may only be used with other monomers in a mixture because they alone would not give rise to a homopolymer whose glass transition temperature is less than about 10° C., such as for example methyl methacrylate, a monomer whose homopolymer has a $T_g$ of 105° C.

In addition, conventional coating components such as, for example, pigments, dispersants, surfactants, coalescents, wetting agents, rheology modifiers, thickeners, drying retarders, biocides, antifoaming agents, colorants, waxes, and the like may be used in the latex of the tiecoat of this invention.

The latex polymer is incorporated into the asphalt emulsion at a level of from about 5% latex solids/95% asphalt emulsion solids to about 85% latex solids/15% asphalt emulsion solids, based on the % total solids of the admixture, more preferably from about 15% latex solids/85% asphalt emulsion solids to about 85% latex solids/15% asphalt emulsion solids and most preferably from about 15% latex solids/85% asphalt emulsion solids to about 50% latex solids/50% asphalt emulsion solids.

The overall level of solids in the tiecoat is from about 10% by weight to about 75% by weight of the weight of the tiecoat. We have found that if the total weight % solids is less than about 10% it is detrimental to tack, lowers the viscosity of the tiecoat below a usable level and unduly prolongs the application of the tiecoat. Total weight % solids greater than about 75% have been found to be detrimental to the stability of the tiecoat and increase the viscosity of the tiecoat above a usable level. The level of solids in the tiecoat is more preferably from about 40% by weight to about 60% by weight, based on the total weight %.

Applications of the tiecoat may be made to various substrates, such as for example asphalt-containing substrates, bitumen-containing substrates or modified bitumen, cement/asbestos shingles or roofing panels, urethane foam roofing panels, deteriorated concrete, and the like. The tiecoat may be applied by conventional techniques, such as for example by brush, roller, airless spray, and the like.

A tiecoat is applied to a substrate, such as for example a bituminous surface prone to releasing colored bodies which would otherwise migrate into and discolor a mastic topcoat if it were directly applied to the substrate or if it were applied to an non-latex modified asphalt emulsion tiecoat. The application of the tiecoat is an additional step in the application of the overall mastic coating system. It is essential that the tiecoat rapidly become low in tack so that the subsequent mastic topcoat can promptly be applied by operators walking on the tiecoat such that the overall application process is not unduly prolonged.

The following examples are intended to illustrate the method of using a tiecoat, to which this invention is directed. They are not intended to limit the invention as other applications of the invention will be obvious to those of ordinary skill in the art.

EXAMPLE 1

Preparation of Mastic Topcoat

Preparation of mastic topcoat 1

The following ingredients were combined and ground for 15 minutes on a high speed Cowles disperser:

| | |
|---|---|
| Water | 161.60 g |
| Hydroxyethyl cellulose (NATRSOL ® 250 MXR) | 4.42 g |
| Anionic dispersant (30% total solids) (TAMOL ® 901) | 5.02 g |
| Ethylene glycol | 25.70 g |
| Defoamer (NOPCO ® NXZ) | 2.01 g |
| Potassium tripolyphosphate | 1.51 g |
| Calcium carbonate (DURAMITE ®) | 385.79 g |
| Titanium dioxide (TiPURE ® R-960) | 74.09 g |

The grind was let down at low speed with the following ingredients:

| | |
|---|---|
| Latex polymer (55% total solids) 65.35 BA/33.82 MMA/0.83 MAA* | 496.00 g |
| Coalescent (TEXANOL ®) | 7.32 g |
| Mildewcide (SUPER-AD-IT ®) | 1.00 g |
| Defoamer (NOPCO ® NXZ) | 2.01 g |

*Note:
BA = butyl acrylate; MMA = methyl methacrylate; MAA = methacrylic acid

EXAMPLE 2

Preparation of Mastic Topcoat

Preparation of mastic topcoat 2

The following ingredients were combined and ground for 15 minutes on a high speed Cowles disperser:

| | |
|---|---|
| Water | 140.74 g |
| Hydroxyethyl cellulose (NATRSOL ® 250 MXR) | 16.00 g |
| Anionic dispersant (30% total solids) (TAMOL ® 850) | 4.76 g |
| Ethylene glycol | 24.38 g |
| Defoamer (NOPCO ® NXZ) | 1.90 g |
| Potassium tripolyphosphate | 1.43 g |
| Calcium carbonate (DURAMITE ®) | 422.72 g |
| Titanium dioxide (TiPURE ® R-960) | 70.37 g |
| Zinc oxide (KADOX ® 515) | 46.95 g |

The grind was let down at low speed with the following ingredients:

| | |
|---|---|
| Latex polymer (55% total solids) 85.00 BA/12.35 MMA/1.65 MAA/1.0 UMA* | 470.59 g |
| Coalescent (TEXANOL ®) | 6.95 g |
| Defoamer (NOPCO ® NXZ) | 1.90 g |
| Mildewcide (SKANE ® M-8) | 2.10 g |
| Ammonium hydroxyide (28% ammonia) | 0.95 g |

*Note:
BA = butyl acrylate; MMA = methyl methacrylate; MAA = methacrylic acid; UMA = ureido-functional methacrylate as disclosed by U.S. Pat. No. 4,777,265 incorporated herein by reference

EXAMPLE 3

Preparation of Tiecoats

To prepare the tiecoats of this invention, a weighed amount of each of the following samples of commercially-available latices (Table 3.1) was added to SS-1 h type asphalt emulsion [Sahuaro (60.0% solids, 23-27 pen hardness)] to give tiecoats with 15%, 50%, 85% and 100% latex solids, based on % total solids in the tiecoat (Table 3.2). The latex-modified asphalt emulsion was stirred for 5 minutes at ambient temperature with a laboratory mixer.

TABLE 3.1

| | Latex Polymers | | | |
|---|---|---|---|---|
| Latex Polymer | Composition* | % Total Solids | pH | Tg (°C.) |
| 1 | EVA | 55.0 | 5.1 | 11 |
| 2 | Sty/Bd (24/76) | 70.5 | 9.5 | −55 |
| 3 | AN/Bd (44/56) | 41.0 | 10.8 | −21 |
| 4 | Chloroprene | 59.0 | 12.5 | −42 |
| 5 | Chloroprene | 45.0 | 12.0 | −40 |
| 6 | Sty/Bd (24/76) | 68.0 | 10.0 | −56 |
| 7 | Sty/Acrylic | 49.5 | 7.4 | −12 |
| 8 | Sty/Bd (24/76) | 69.0 | 10.0 | −56 |
| 9 | Acrylic | 58.0 | 4.3 | — |

*Note:
EVA = ethylene/vinyl acetate copolymer; Sty = styrene; Bd = butadiene; AN = acrylonitrile

TABLE 3.2

| | Preparation of Tiecoats | | | |
|---|---|---|---|---|
| Tiecoat | Amount Latex (g) | Amount Asphalt Emulsion (g) | Tiecoat Composition Latex Asphalt Emulsion (% solids) | |
| Comparative A | 0 | 200.0 | 0 | 100 |
| Comparative B | 0 | 200.0 | 0 | 100 |
| Control** | 0 | 0 | 0 | 0 |

TABLE 3.2-continued

| | Preparation of Tiecoats | | | |
|---|---|---|---|---|
| Tiecoat | Amount Latex (g) | Amount Asphalt Emulsion (g) | Tiecoat Composition Latex Asphalt Emulsion (% solids) | |
| 1A | 38.5 | 200.0 | 15 | 85 |
| 2A | 30.0 | 200.0 | 15 | 85 |
| 3A | 51.6 | 200.0 | 15 | 85 |
| 3B | 51.6 | 200.0 | 15 | 85 |
| 3C | 292.7 | 200.0 | 50 | 50 |
| 3D | 1658.5 | 200.0 | 85 | 15 |
| 3E | 200.0 | 0 | 100 | 0 |
| 4A | 35.9 | 200.0 | 15 | 85 |
| 4B | 35.9 | 200.0 | 15 | 85 |
| 4C | 203.4 | 200.0 | 50 | 50 |
| 4D | 1152.5 | 200.0 | 85 | 15 |
| 4E | 200.0 | 0 | 100 | 0 |
| 5A | 47.1 | 200.0 | 15 | 85 |
| 5B | 266.7 | 200.0 | 50 | 50 |
| 5C | 1511.1 | 200.0 | 85 | 15 |
| 5D | 200.0 | 0 | 100 | 0 |
| 6A | 31.1 | 200.0 | 15 | 85 |
| 6B | 31.1 | 200.0 | 15 | 85 |
| 6C | 176.5 | 200.0 | 50 | 50 |
| 6D | 1000.0 | 200.0 | 85 | 15 |
| 6E | 200.0 | 0 | 100 | 0 |
| 7A | 42.8 | 200.0 | 15 | 85 |
| 7B | 42.8 | 200.0 | 15 | 85 |
| 7C | 242.4 | 200.0 | 50 | 50 |
| 7D | 1373.7 | 200.0 | 85 | 15 |
| 7E | 200.0 | 0 | 100 | 0 |
| 8A | 30.7 | 200.0 | 15 | 85 |
| 8B | 30.7 | 200.0 | 15 | 85 |
| 8C | 173.9 | 200.0 | 50 | 50 |
| 8D | 985.5 | 200.0 | 85 | 15 |
| 8E | 200.0 | 0 | 100 | 0 |
| 9A | 36.5 | 200.0 | 15 | 85 |

**Control contains no tiecoat

EXAMPLE 4

Effect of Latex-Modified Asphalt Emulsion on Resistance to Tack of Tiecoat

To plaques of BRAI® (U.S. Intec Corporation) atactic polypropylene-modified bitumen, a tiecoat was applied with a #40 drawdown bar to a wet film thickness of about 6 mils. The BRAI® plaques were dried for 3 hours in direct sunlight between 11 am and 2 pm. Tack resistance was evaluated by finger touch (Table 4.1)

TABLE 4.1

| Resistance to Tack Results | |
|---|---|
| Tiecoat | Resistance to Tack |
| Comparative A | excellent |
| Comparative B | excellent |
| 1A | excellent |
| 2A | excellent |
| 3A | excellent |
| 3B | very good+ |
| 3C | excellent |
| 3D | very good |
| 3E | very good− |
| 4A | excellent |
| 4B | excellent |
| 4C | excellent |
| 4D | excellent |
| 4E | good |
| 5A | excellent |
| 5B | excellent |
| 5C | excellent |
| 5D | fair |
| 6A | excellent |
| 6B | excellent |
| 6C | excellent |
| 6D | excellent |
| 6E | very good |

TABLE 4.1-continued

| Resistance to Tack Results | |
|---|---|
| Tiecoat | Resistance to Tack |
| 7A | very good |
| 7B | excellent |
| 7C | very good |
| 7D | fair |
| 7E | poor |
| 8A | excellent |
| 8B | excellent |
| 8C | excellent |
| 8D | very good |
| 8E | good |
| 9A | excellent |

Good to excellent resistance to tack was maintained with the latex-modified asphalt emulsion tiecoat with modification up to 85% latex solids. This permits the prompt coating of the tiecoat with a subsequent topcoat.

EXAMPLE 5

Effect of Latex-Modified Asphalt Emulsion on Resistance to Bleed-Through Discoloration of Mastic Coating System To plaques of BRAI® (U.S. Intec Corporation) atactic polypropylene-modified bitument, a tiecoat was applied with a #40 drawdown bar to a wet film thickness of about 6 mils. The BRAI® plaques were dried for 3 hours in direct sunlight between 11 am and 2 pm. A mastic topcoat was applied with a drawdown knife at a wet film thickness of about 20 mils. After 24 hours ambient drying, the samples were cut into several pieces. The samples were evaluated for bleed-through resistance after 4 weeks at ambient temperature by measuring the color of the top surface of the mastic coating with a Minolta CR-231 Colorimeter, direct reading. Each sample was measured in duplicate, selecting different parts of the sample for each reading. In Table 5.1, the average of the two b* readings is given. The b* value is a measurement of the yellowness of the sample. On this scale, 0=absolute whiteness, 7.0-7.5=threshhold of faint discoloration for most observers and 30=light brown.

TABLE 5.1

| Resistance to Bleed-Through Discoloration Results | | |
|---|---|---|
| | b* value | |
| Tiecoat | Mastic Topcoat 1 | Mastic Topcoat 2 |
| Comparative A | 10.0 | 7.0 |
| Comparative B | 9.1 | 6.3 |
| Control | 6.4 | 2.8 |
| 1A | 6.5 | 5.5 |
| 2A | 4.8 | 2.8 |
| 3A | 4.5 | 3.2 |
| 3B | 5.0 | 3.7 |
| 3C | 3.8 | 2.7 |
| 3D | 3.6 | 3.0 |
| 3E | 4.2 | 2.5 |
| 4A | 5.0 | 3.6 |
| 4B | 4.9 | 3.6 |
| 4C | 4.2 | 3.5 |
| 4D | 3.6 | 3.7 |
| 4E | 1.8 | 3.2 |
| 5A | 4.5 | 3.5 |
| 5B | 3.2 | 3.4 |
| 5C | 3.6 | 3.9 |
| 5D | 4.1 | 3.2 |
| 6A | 5.2 | 3.7 |
| 6B | 3.8 | 2.6 |
| 6C | 4.4 | 2.4 |
| 6D | 4.6 | 2.8 |
| 6E | 5.5 | 1.7 |

TABLE 5.1-continued

| | Resistance to Bleed-Through Discoloration Results | |
|---|---|---|
| | b* value | |
| Tiecoat | Mastic Topcoat 1 | Mastic Topcoat 2 |
| 7A | 6.9 | 4.1 |
| 7B | 9.6 | 5.4 |
| 7C | 6.3 | 3.1 |
| 7D | 5.2 | 2.1 |
| 7E | 3.2 | 1.8 |
| 8A | 4.9 | 3.1 |
| 8B | 3.7 | 2.3 |
| 8C | 3.6 | 2.3 |
| 8D | 4.0 | 2.3 |
| 8E | 5.3 | 2.8 |
| 9A | 7.0 | 4.8 |

The tiecoats containing a latex-modified asphalt emulsion reduced the yellowing apparent on the surface of the mastic topcoats exposed to ambient temperatures compared with the tiecoats with no latex modification.

EXAMPLE 6

Effect of Latex-Modified Asphalt Emulsion on Resistance to Bleed-Through Discoloration of Mastic Coating System The samples were prepared according to the procedure in Example 5. The samples, however, were evaluated for resistance to bleed-through discoloration after 2 weeks at 50° C. by the same method employed in Example 7 (Table 6.1). Only mastic coating systems with mastic topcoat 2 were utilized.

TABLE 6.1

| Resistance to Bleed-Through Discoloration Results | |
|---|---|
| Tiecoat | b* value |
| Comparative A | 10.3 |
| Comparative B | 11.0 |
| Control | 7.5 |
| 1A | 7.0 |
| 2A | 8.1 |
| 3A | 6.0 |
| 3B | 7.4 |
| 3C | 6.2 |

TABLE 6.1-continued

| Resistance to Bleed-Through Discoloration Results | |
|---|---|
| Tiecoat | b* value |
| 4A | 6.2 |
| 4B | 7.0 |
| 5A | 5.6 |
| 7A | 8.3 |
| 7B | 7.4 |
| 8A | 6.0 |
| 8B | 8.4 |
| 9A | 7.0 |

The tiecoats containing a latex-modified asphalt emulsion reduced the yellowing apparent on the surface of the mastic coating exposed to an elevated temperature of 50° C.

What is claimed is:

1. A method for improving the quality of a mastic coating system comprising:
   (a) forming an aqueous tiecoat composition incorporating an asphalt emulsion containing admixed therein at least one latex polymer having a glass transition temperature of less than about 10° C., where said composition contains from about 5% latex solids and 95% asphalt emulsion solids to about 85% latex solids and 15% asphalt emulsion solids, based on the % total solids in the admixture,
   (b) applying the tiecoat composition to a substrate surface; and
   (c) applying a mastic topcoat onto the tiecoat composition.

2. The method of claim 1 wherein the tiecoat is from about 15% latex solids and 85% asphalt emulsion solids to about 85% latex solids and 15% asphalt emulsion solids, based on total % solids.

3. The method of claim 1 wherein the tiecoat is from about 15% latex solids and 85% asphalt emulsion solids to about 50% latex solids and 50% asphalt emulsion solids, based on total % solids.

4. The method of claim 1 wherein the substrate surface is selected from the group consisting of asphaltic, bituminous, cement/asbestos, urethane foam and concrete substrates.

5. The method of claim 1 wherein the substrate surface is an asphaltic or bituminous substrate.

* * * * *